Aug. 17, 1954  G. SCHMIDT  2,686,312
SHAPE SUPPORTING MEMBERS FOR BRASSIERES
AND RELATED ARTICLES
Filed April 5, 1952
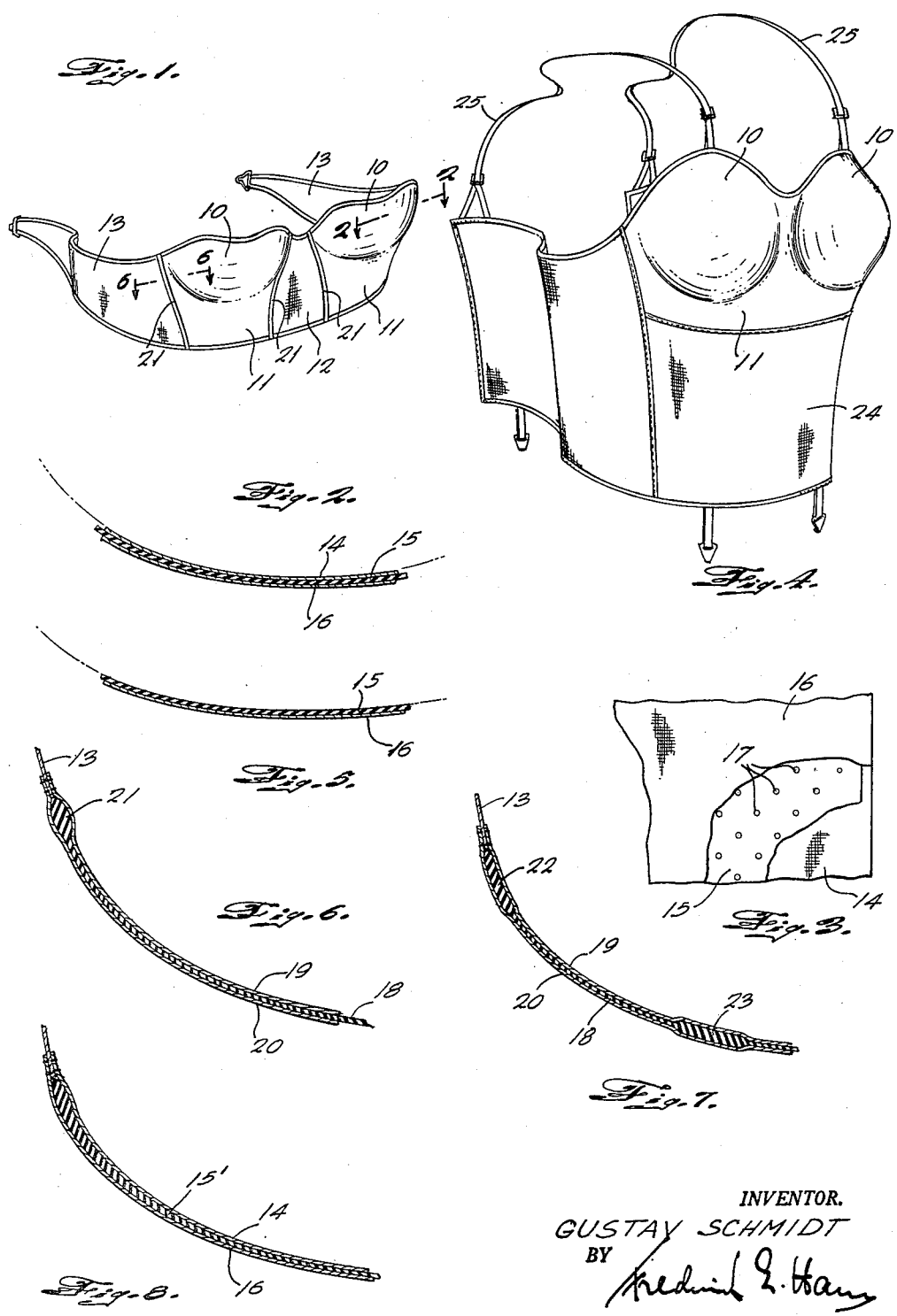
INVENTOR.
GUSTAV SCHMIDT
BY
ATTORNEY.

Patented Aug. 17, 1954

2,686,312

UNITED STATES PATENT OFFICE 2,686,312

SHAPE SUPPORTING MEMBERS FOR BRASSIÈRES AND RELATED ARTICLES

Gustav Schmidt, Coburg, Germany, assignor to Escora-Corset-Fabrik Eduard Schmidt G. m. b. H., Coburg, Germany, a German company Application April 5, 1952, Serial No. 280,703

Claims priority, application Germany April 9, 1951

8 Claims. (Cl. 2—42)

This invention relates to washable brassières, corsets, bodices, girdles, belts, etc., and more particularly to form-shaping and retaining members for use with such articles.

One of the objects of the present invention is to provide form-shaping support members for articles of the general type, above referred to, which members are water resistant and retain their shape at the temperatures to which they are normally exposed, such as body temperatures, and which members are also sufficiently pliable or yielding to follow closely the body contours without exerting undue pressure.

Another more specific object of the invention is to provide form-shaping supporting members comprising the breast-supporting cup portions of a brassière and also retaining members resting against and following the contours of the thorax portions just below the breasts.

Another object of the invention is to provide, for the purpose aforesaid, a material composed of several layers bonded together, one layer of the said material being made of pliable and water resistant material such as a thermoplastic while the other layer or layers are made of fabric. The fabric layers may be disposed on one side or both sides of the thermoplastic layer.

Still another object of the invention is to provide stiffeners for an article of the general type, above referred to, which stiffeners may consist of ribs formed by the thermoplastic material itself or of inserts such as rods made of metal or whalebone.

As will be apparent from the subsequent detailed description of the invention, the invention permits to produce articles of the general type, above referred to, which are form-shaping and supporting, washable and reasonably insensitive to perspiration.

In the accompanying drawing several now preferred embodiments of the invention are shown by way of illustration and not by way of limitation.

In the drawing:

Fig. 1 is a perspective front view of a strapless brassière according to the invention.

Fig. 2 is a section taken on line 2—2 of Fig. 1 on an enlarged scale.

Fig. 3 is a fragmentary view of the layers of the material used for the members according to the invention.

Fig. 4 is a perspective front view of a long brassière according to the invention.

Fig. 5 is a fragmentary sectional view of a modification of the material used for members according to the invention.

Fig. 6 is a sectional view taken on line 6—6 of Fig. 1.

Fig. 7 is a modification of Fig. 6 showing stiffening beads of a somewhat different shape, and Fig. 8 is a fragmentary sectional view of material according to the invention showing a thermoplastic layer of gradually decreasing thickness.

Referring first to Fig. 1, the strapless brassière according to this figure comprises two support members each formed by a cup-shaped portion 10 and a depending portion 11 faired in the base rim of portion 10, integral therewith. The two support members of the brassière are joined by a fabric portion 12 and attached to straps 13 of conventional design for securing the brassière in position. Each of the support members 10 and 11 is made of a multi-ply material according to the invention. This material is composed of inner fabric layer 14, intermediate form-preserving and formed layer 15 and an outer fabric layer 16, as can best be seen on Fig. 2. While generally the use of an inner and an outer fabric layer is preferable, it is in certain instances also practical to employ an inner fabric layer only as is shown on Fig. 5. Furthermore, the intermediate layer may have perforations 17 as is shown on Fig. 3.

The intermediate layer 15 consists of a thermoplastic material which is water resistant and permanent as to shape at ordinary temperatures, such as body temperature, but sufficiently pliable or flexible to adapt itself, after being properly pre-formed, to the contours of the body without exerting undue pressure. I have found that a vinyl polymerisat, particularly polyvinyl chloride, is highly suitable for the purpose.

The fabric layer or layers—several layers of fabric may be provided on each side of the thermoplastic layer—may be woven, netted, knotted or plaited from threads. The fabric layers may also be formed of single fibers for example in the form of a felted material. A lace material or a lustrous material can also be used. On the side of the brassière facing the skin of the wearer a soft fabric is particularly advantageous.

It is essential for the purpose of the invention that the fabric material be firmly bonded to the thermoplastic layer over the entire or substantially the entire surface of the fabric layer or layers. If a fabric is made of threads, all or practically all the threads should be firmly secured to the thermoplastic material wherever the fabric material is in contact with the thermoplastic layer. With a fabric layer or layers consisting of felted material, practically all the fibers on the side of the felt layer abutting against the thermoplastic layer should be firmly bonded to the thermoplastic layer. It is also essential that the fibers of the fabric layer or layers are not bonded to the thermoplastic layer throughout the whole thickness of the fibrous material since then the fibrous material would substantially lose its fibrous properties and would become in effect a layer of fibrous material embedded in the material of the thermoplastic layer.

The desired firm union between the fibrous material and the thermoplastic layer without causing the aforementioned undesirable bonding of the fibrous material throughout its thickness can be attained by pressing together the thermoplastic layer and the fibrous material at a temperature at which the thermoplastic material just becomes sufficiently tacky to bind the surface fibers of the fibrous material. With the comparatively low pressure generally used for the purpose here in question, the required temperatures are usually at the border of the softening temperature of the thermoplastic material.

As previously mentioned, the nature and thickness of the thermoplastic layer are selected so that the cup-shaped portions 10 and depending portions 11 are on one hand sufficiently pliable to be comfortable and on the other hand possess sufficient stiffness to provide an adequate support for the breasts. The thickness of the thermoplastic layer is preferably between 0.1 and 2.0 mm., preferably between 1 and 2 mm.

Generally it is advisable to employ a multi-ply member which has the same thickness over its entire area. However, in certain instances it may be advantageous to increase the stiffness of the thermoplastic layer at certain portions thereof by providing additional layers of thermoplastic material at such portions so that such reinforced portions have a total thickness which may be two times or more the thickness of the remainder of the thermoplastic layer. Instead of providing a layer which increases in thickness step by step, a gradual increase or decrease in the thickness of the thermoplastic layer may also be employed. Fig. 8 shows a thermoplastic layer 15' which decreases in thickness toward its center portion.

The support members according to the invention can be conveniently manufactured by first preparing flat multi-ply material by superposing a thermoplastic layer and one or more layers of fibrous material, for example a strip of a woven fabric, and then bonding the layers together by the application of pressure and heat. The multi-ply material, thus produced, is then molded by application of heat and pressure. If desired, an additional fibrous layer may be added during the molding operation.

In many cases it is advantageous to apply the thermoplastic layer to a preformed layer of fibrous material, for which purpose the fibrous material may have a configuration in accordance with the final configuration or approximately the final configuration of the article.

The adhesion between the thermoplastic material and the fibrous material can be increased by the use of agents promoting tackiness of the thermoplastic material. For example thermoplastic materials can be used which contain a certain amount of solvents or swelling agents or such solvents or swelling agents can be added. The choice of the solvents and swelling agents depends of course upon the type of the used thermoplastic material. It has been found that generally vinylacrylic acid polymerisates are suitable. Benzene can be employed as solvent and ethyl-alcohol as swelling agent.

The breast-supporting portions 10 and the depending portions 11 may be additionally stiffened for instance by inserting suitably shaped rods made of whalebone or metal in pockets provided for this purpose along the marginal portions of the cup portions 10 and/or the depending portions 11. The use of such stiffening rods is particularly advisable for the strapless brassière according to Fig. 1.

It has been found to be particularly advantageous to stiffen the support members themselves rather than to provide separate stiffening rods. According to Fig. 6 either the portions 10 or the portions 11 are composed of a thermoplastic layer 18, an inner soft fibrous layer 19 and an outer fabric layer 20. The marginal edge of the support members adjacent to one of the straps 13 is reinforced by the formation of a bead 21. With a strapless brassière the upper edge of the brassière may also be reinforced by a beading such as shown at 21.

Fig. 7 shows a portion 10 or 11 which is provided at both side edges with beadings 22 and 23. Any other portions of the brassière may be stiffened, if desired, by providing an appropriate beading.

The hereinbefore described cup portions 10 and the depending portions 11, if any, are secured to the intermediate portions 12 and the straps 13 of the brassière by any suitable means such as sewing.

The cup portions and the depending portions can be employed in connection with various types of brassières. Fig. 4 shows a so-called long brassière for more mature figures. The brassière according to Fig. 4 shows breast-supporting cup portions 10, thorax supporting depending portions 11 and a chest or stomach supporting portion 24. The brassière may be secured by means of straps 25 and hooks in a conventional manner.

The breast-supporting portions and/or the depending portions according to the invention can also be incorporated in other items of female wearing apparel such as corsets, girdles, belts, bathing suits, slips, etc.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A brassière comprising two breast support members, each of said members having a cup portion shaped to support the lower half of one breast of the wearer and a depending portion faired in the base rim of the cup portion integral therewith and shaped to fit the contour of the respective thorax portion of the wearer, the free lower edge of said depending portion being substantially straight and generally parallel to the upper edge of the cup portion, each of said support members being made of a laminated material composed of a layer of pliable plastic sheet material and a co-extensive layer of pliable fibrous fabric bonded with its fibers to the plastic sheet over substantially the entire area of contact, the pliability of said laminated material being such that it adapts itself in a yielding manner to the shape of the breasts and the contour of the respective thorax portion while, at the same time, generally retaining its form, a soft inner fabric strip joining the two support members in breast supporting relationship with said straight edges of the support members in alignment, and two outer fastening strips made of fabric extending from the respective sides of the support members.

2. A brassière according to claim 1 and further comprising a second pliable fibrous fabric layer bonded to the plastic sheet material on the side thereof opposite to said first fabric layer and coextensive with said latter layer.

3. A brassière according to claim 1, wherein the said plastic layer is made of a vinyl polymerisat.

4. A brassière according to claim 3, wherein the said vinyl polymerisat is a polyvinyl chloride.

5. A brassière according to claim 1, wherein the said plastic layer is of non-uniform thickness.

6. A brassière according to claim 5, wherein the thickness of said plastic layer decreases toward the center portion of said layer.

7. A brassière according to claim 1, wherein elongated stiffening ribs are formed along the lateral marginal portions of said plastic layer.

8. A brassière according to claim 7, wherein the said ribs comprise beads formed from said plastic sheet material along the lateral marginal portions thereof.

References Cited in the file of this patent

UNITED STATES PATENTS

| Number | Name | Date |
|---|---|---|
| 2,304,989 | Snowdon | Dec. 15, 1942 |
| 2,462,295 | Wittenberg | Feb. 22, 1949 |

FOREIGN PATENTS

| Number | Country | Date |
|---|---|---|
| 656,197 | Great Britain | Aug. 15, 1951 |
| 969,259 | France | May 17, 1950 |